United States Patent
Park et al.

(10) Patent No.: US 10,698,519 B2
(45) Date of Patent: Jun. 30, 2020

(54) METHOD AND ELECTRONIC DEVICE FOR ACQUIRING USER INPUT

(71) Applicant: Samsung Electronics Co., Ltd, Suwon-si (KR)

(72) Inventors: Byung-Ku Park, Anyang-si (KR); Do-Kyun Lee, Seoul (KR); Seung-Chul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/779,504

(22) PCT Filed: Nov. 25, 2016

(86) PCT No.: PCT/KR2016/013722
§ 371 (c)(1),
(2) Date: May 25, 2018

(87) PCT Pub. No.: WO2017/091039
PCT Pub. Date: Jun. 1, 2017

(65) Prior Publication Data
US 2018/0348942 A1    Dec. 6, 2018

(30) Foreign Application Priority Data
Nov. 26, 2015    (KR) .................... 10-2015-0166818

(51) Int. Cl.
*G06F 3/041* (2006.01)
*G06F 3/0354* (2013.01)
(Continued)

(52) U.S. Cl.
CPC .......... *G06F 3/0414* (2013.01); *G06F 3/0202* (2013.01); *G06F 3/03547* (2013.01);
(Continued)

(58) Field of Classification Search
None
See application file for complete search history.

(56) References Cited

U.S. PATENT DOCUMENTS 4,489,302 A * 12/1984 Eventoff ............. B60C 23/0408
338/100
4,761,582 A    8/1988 McKee
(Continued)

FOREIGN PATENT DOCUMENTS

JP    2003-296014 A    10/2003
JP    2009-016330 A    1/2009
(Continued)

OTHER PUBLICATIONS

International Search Report dated Feb. 21, 2017 in connection with International Patent Application No. PCT/KR2016/013722.

*Primary Examiner* — Dorothy Harris

(57) ABSTRACT

According to various examples of the present invention, an electronic device can comprise: a board; a switch unit loaded on at least one surface of the board; a pressure module provided between the board and the switch unit; and a pressure sensing unit formed in at least a partial area of the board, and generating a signal by sensing at least one drive according to the pressing of the switch unit. In addition, the above electronic device can be variously implemented according to examples.

13 Claims, 16 Drawing Sheets

(51) Int. Cl.
  *H01H 13/703* (2006.01)
  *G06F 3/02* (2006.01)
  *H01H 13/807* (2006.01)
  *G06K 9/00* (2006.01)
  *H01H 13/785* (2006.01)

(52) U.S. Cl.
  CPC ........... *G06F 3/041* (2013.01); *G06K 9/0002* (2013.01); *G06K 9/00006* (2013.01); *H01H 13/703* (2013.01); *H01H 13/785* (2013.01); *H01H 13/807* (2013.01); *G06F 2203/04105* (2013.01); *H01H 2201/036* (2013.01); *H01H 2225/018* (2013.01)

(56) References Cited

U.S. PATENT DOCUMENTS

| | | | | |
|---|---|---|---|---|
| 4,965,415 | A | | 10/1990 | Young et al. |
| 5,152,392 | A | * | 10/1992 | Iwasa ................... H01H 13/705 200/329 |
| 5,231,386 | A | * | 7/1993 | Brandenburg ......... G05G 9/047 200/5 R |
| 5,278,557 | A | * | 1/1994 | Stokes ................. G06F 3/0338 200/520 |
| 5,315,204 | A | * | 5/1994 | Park ....................... H01H 57/00 310/339 |
| 5,999,084 | A | * | 12/1999 | Armstrong ........... H01C 10/106 200/516 |
| 6,351,205 | B1 | * | 2/2002 | Armstrong ........... H01C 10/106 338/114 |
| 7,213,323 | B2 | * | 5/2007 | Baker ...................... G01L 1/20 29/592.1 |
| 9,882,561 | B2 | * | 1/2018 | Kurikawa ............ H03K 17/975 |
| 2002/0050919 | A1 | | 5/2002 | Vance |
| 2003/0169231 | A1 | * | 9/2003 | Rekimoto ............. G06F 3/0362 345/156 |
| 2004/0200699 | A1 | * | 10/2004 | Matsumoto .......... H01H 13/702 200/1 B |
| 2005/0174260 | A1 | * | 8/2005 | Arneson ............... G06F 3/0234 341/34 |
| 2005/0248472 | A1 | * | 11/2005 | Wei ........................ H03K 17/94 341/20 |
| 2007/0039811 | A1 | * | 2/2007 | Yanai ..................... H01H 13/48 200/406 |
| 2007/0184877 | A1 | * | 8/2007 | In ........................... G06F 3/023 455/565 |
| 2007/0242037 | A1 | * | 10/2007 | Son ....................... G06F 3/0414 345/156 |
| 2008/0296140 | A1 | * | 12/2008 | Yoshihara ............ H01H 13/785 200/512 |
| 2009/0008234 | A1 | * | 1/2009 | Tolbert ................. H01H 13/702 200/600 |
| 2009/0272639 | A1 | * | 11/2009 | Mittleman ............. H01H 13/79 200/345 |
| 2010/0079395 | A1 | | 4/2010 | Kim et al. |
| 2010/0193342 | A1 | * | 8/2010 | Roh ........................ H04M 1/23 200/5 A |
| 2010/0253633 | A1 | | 10/2010 | Nakayama et al. |
| 2010/0313680 | A1 | | 12/2010 | Joung et al. |
| 2012/0199459 | A1 | * | 8/2012 | Reise ................... H01H 13/705 200/5 A |
| 2013/0018489 | A1 | * | 1/2013 | Grunthaner ............ G06F 3/041 700/73 |
| 2013/0088423 | A1 | * | 4/2013 | Kim ........................ H01H 13/78 345/156 |
| 2013/0100030 | A1 | * | 4/2013 | Los ......................... G06F 3/023 345/169 |
| 2013/0161179 | A1 | * | 6/2013 | Tamura ................ H03K 17/962 200/600 |
| 2013/0228023 | A1 | | 9/2013 | Drasnin et al. |
| 2013/0338847 | A1 | * | 12/2013 | Lisseman ........... H03K 17/9625 700/301 |
| 2014/0252883 | A1 | * | 9/2014 | Dinh ...................... H01H 13/06 307/125 |
| 2015/0277620 | A1 | * | 10/2015 | Bulea ................... G06F 3/0202 345/168 |
| 2016/0062517 | A1 | * | 3/2016 | Meyer ................... G06F 3/0414 345/173 |

FOREIGN PATENT DOCUMENTS

| | | |
|---|---|---|
| JP | 2013-188452 A | 9/2013 |
| KR | 10-2010-0035475 A | 4/2010 |
| KR | 10-2010-0088832 A | 8/2010 |
| KR | 10-2014-0134281 A | 11/2014 |

* cited by examiner

METHOD AND ELECTRONIC DEVICE FOR ACQUIRING USER INPUT

CROSS-REFERENCE TO RELATED APPLICATIONS AND CLAIM OF PRIORITY

This application is a 371 of PCT International Application No. PCT/KR2016/013722 filed on Nov. 25, 2016, which claims priority to Korean Patent Application No. 10-2015-0166818 filed on Nov. 26, 2015, the disclosures of which are herein incorporated by reference in their entirety.

BACKGROUND

1. Field

Various embodiments disclosed herein relate to an electronic device, and more particularly, to a method and an electronic device for acquiring a user input capable of implementing input in, for example, at least two ways.

2. Description of the Related Art

Buttons for inputting information to an electronic device may be designed in various forms according to the uses thereof. However, it is possible to adopt physical buttons for providing physical texture and buttons in the form of icons for visually expressing the meaning of the buttons as a basic configuration. In addition, buttons for inputting information to the electronic device include buttons attached to a keyboard of a computer or a notebook computer, operation buttons of various portable devices (e.g., a phone book, a terminal, an electronic organizer, and a game machine), buttons attached to remote controllers and various electronic products, which can be usually found around, etc.

SUMMARY

An electronic device may include an input device that is separately provided in the electronic device in order to implement various inputs by the input device, in addition to an input through the screen touch of a display.

For example, a side key, a center on/off key, or the like of the electronic device may be separately provided in a side face, a peripheral portion, or the like of an electronic device in the same manner as physical button keys. In addition, a touch pad and a dome switch may be provided together such that menu selection, shift, driving, etc. are enabled according to a touch of the touch pad and a pressed state of the dome switch.

As described above, in implementing an input to an electronic device, a touch-based input that recognizes contact or proximity with respect to a display unit may co-exist with a mechanical type input using a physical button key or the like.

A mechanical button key or a physical button key provided in an electronic device, for example, a dome switch may be capable of providing an expression before being pressed and an expression after being pressed. For example, a pattern connected to a ground GND and a pin of a General Purpose Input/Output (GPIO) may be operated in such a manner that an OFF signal or an ON signal as the dome switch is pressed.

An input device such as a touch pad having a dome switch is merely capable of implementing an input of ON or OFF according to a movement on a plane along the touch pad and the pressing of the dome switch and is not capable of implementing various inputs.

Accordingly, various embodiments of the present disclosure provide a method and an electronic apparatus for acquiring a user input in which various inputs can be implemented depending not only on an input according to a touch or a pressing operation, but also on a pressure value generated in a pressing operation.

In addition, various embodiments of the present disclosure provide a method and an electronic device for acquiring a user input in which an input based on pressure sensing can be implemented in addition to a physical input or a contact input through a simple structure.

According to various embodiments of the present disclosure, an electronic device may include:
a board;
a switch unit mounted on at least one face of the board;
a pressure module provided between the pressure unit and the switch unit; and
a pressure sensing unit disposed in the partial region of the board and configured to generate a signal by sensing at least one drive according to pressing of the switch unit.

Therefore, an electronic device according to various embodiments is able to implement a first input such as an inward pressing of a module capable of sensing contact, and a second input according to pressure values of various intensities, generated at the time of pressing different from the inward pressing.

Further, the electronic device according to various embodiments is able to recognize both of a first input according to the switch member and a second input according to the pressure module, so that it is possible to perform various user environment according to a combination of the input value according to the pressing and the pressure values according to the pressure intensities.

Further, the electronic device according to various embodiments has an advantage in that it can be implemented for various user environment only with a simple structure in which the dome switch member and the pressure module are stacked each other.

BRIEF DESCRIPTION OF THE DRAWINGS

The above and other aspects, features and advantages of the present disclosure will be more apparent from the following detailed description taken in conjunction with the accompanying drawings, in which.

Figure 1A:
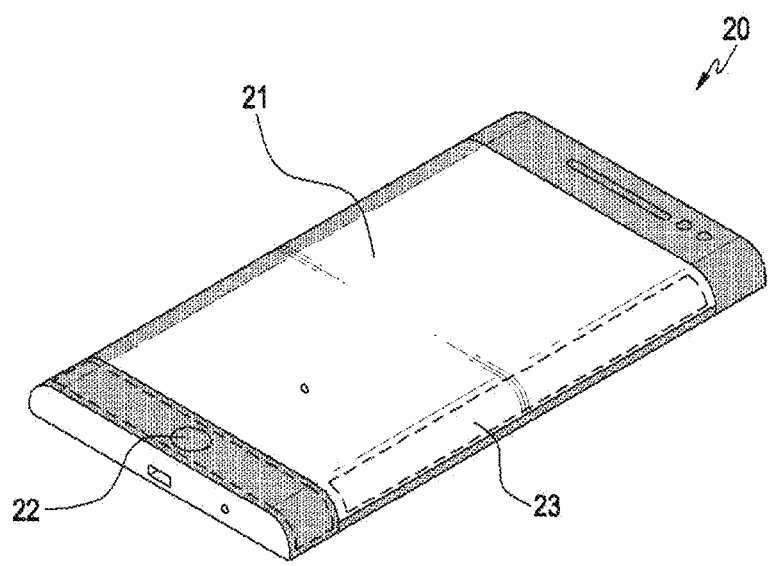
FIG. 1A is a schematic perspective view illustrating an electronic device according to various embodiments.

DESCRIPTION OF REFERENCE NUMERALS 10, 20: electronic device 11, 21: display
100: input device 110: board
120: pressure module 130: switch unit
140: pattern unit

DETAILED DESCRIPTION

Hereinafter, various embodiments of the present disclosure will be described with reference to the accompanying drawings. However, it shall be understood that it is not intended to limit the technology described herein to specific embodiments, and the technology includes various modifications, equivalents, and/or alternatives of the corresponding embodiments. In connection with the description of the drawings, similar components may be denoted by similar reference numerals.

Herein, the terms, such as "have," "may have," "include," and "may include," indicate the existence of corresponding features (e.g., a numerical value, a function, an operation, a constituent element such as a component, and do not exclude the existence of an additional feature.

Herein, the terms, such as "A or B," "at least one of A and/or B," and "one or more of A and/or B," may include all possible combinations of items listed with the terms. For example, "A or B," "A and/or B," or "at least one of A or B" may indicate all of (1) a case including at least one A, (2) a case including at least one B, and (3) a case including at least one A and at least one B.

Herein, the terms, such as "1st," "2nd," "first," and "second" may quality various constituent elements regardless of order or importance and are merely used in order to differentiate one constituent element from another constituent element without limiting the corresponding constituent elements. For example, a first user device and a second user device indicate different user devices regardless of the order or importance thereof. For example, the name of a first constituent element may be changed to be referred to as a second constituent element without departing from the scope of the present disclosure, and similarly, the name of a second constituent element may also be changed to be referred to as a first constituent element.

When it is described that a certain component (e.g., the first constituent element) is "(operatively or communicatively) coupled with/to" or "connected to" another constituent element (e.g., the second constituent element), it shall be understood that the certain constituent element is directly connected to the other constituent element directly or via another constituent element (e.g., a third constituent element). On the contrary, when it is described that a certain component (e.g., the first constituent element) is "directly coupled with/to" or "directly connected to" another constituent element (e.g., the second constituent element), it shall be understood that another constituent element (e.g., the third constituent element) does not exist between the certain constituent element and the other constituent element.

The term used herein, such as "configured to" and "set to," may be interchangeably used with, for example, "suitable for," "having the capacity to," "designed to," "adapted to," "made to," or "capable of" in context. The terms "configured to" and "set to" need not always to mean "specifically designed to" in a hardware manner. Instead, in a certain circumstance, "a device configured to perform . . . " may mean that the device "is capable of performing . . . " with another device or components. For example, phrase, "a processor configured to (or set to) perform A, B, and C" may mean a generic-purpose processor (e.g., a CPU or an application processor) that is capable of performing corresponding operations by performing one or more software program stored in a dedicate processor for performing the corresponding operations (e.g., an embedded processor) or a memory device.

The terms used herein are used to describe specific embodiments and may not be intended to limit the scope of any other embodiment. A singular expression may include a plural expression unless otherwise apparently define the meaning. The terms used herein including technical or scientific terms may have the same meanings as those generally understood by a person ordinarily skilled in the technical field herein. Among the terms used herein, the terms defined in ordinary dictionaries may be interpreted in the meanings that are the same as or similar to the meanings in context in the related arts, and the terms are not interpreted in ideal or excessively formal meanings as long as the terms are not apparently defined. Occasionally, even a term, of which the meaning is defined herein cannot be interpreted to exclude the embodiments described herein.

An electronic device according to various embodiments of the present disclosure may include at least one of, for example, a smart phone, a tablet Personal Computer (PC), a mobile phone, an image phone, an e-book reader, a desktop PC, a laptop PC, a netbook computer, a workstation, a server, a Personal Digital Assistant (PDA), a Portable Multimedia Player (PMP), an MP3 player, a mobile medical device, a camera, and a wearable device. According to various embodiments, the wearable device may include at least one of an accessory type wearable device (e.g., a watch, a ring, a bracelet, an ankle bracelet, a necklace, spectacles, a contact lens, or a Head-Mounted-Device (HMD)), a fabric or cloth-integrated type wearable device (e.g., an electronic cloth), a body attachment type wearable device (e.g., a skin pad or a tattoo), and an implantable wearable device (e.g., an implantable circuit).

In certain embodiments, the electronic device may be a home appliance. For example, the home appliance may include at least one of, for example, a TV, a Digital Video Disk (DVD) player, an audio, a refrigerator, an air conditioner, a cleaner, an oven, a microwave oven, a washer, an air cleaner, a set-top box, a home automation control panel, a security control panel, a TV box (e.g., Samsung HomeSync™, an Apple TV™, or a Google TV™), a game console (e.g., Xbox™ or a Play Station™), an electronic dictionary, an electronic key, a camcorder, and an electronic picture frame.

In another embodiment, the electronic device may include at least one of various medical devices (e.g., various potable medical measuring devices (a blood glucose monitoring device, a heart rate monitor, a blood pressure measuring device, or a clinical thermometer), a Magnetic Resonance Angiography (MRA), a Magnetic Resonance Imaging (MRI), a Computed Tomography (CT), a moving picture camera, or an ultrasonic device), a navigation system, a Global Navigation Satellite System (GNSS), an Event Data Recorder (EDR), a Flight Data Recorder (FDR), an automobile infotainment device, a ship electronic device (e.g., a ship navigation system or a gyro compass), an avionics, a security device, a vehicle head unit), an industrial or home robot, an Automatic Teller's Machine (ATM), a Point Of Sales (POS), and an Internet of things (e.g., a bulb, various sensors, an electric or gas meter, a sprinkler device, a fire alarm, a thermostat, a street lamp, a toaster, exercise equipment, a hot water tank, a heater, and a boiler).

According to a certain embodiment, the electronic device may include at least one of furniture, a part of a building/structure, an electronic board, an electronic signature receiving device, a projector, and various measuring instruments (e.g., water supply, electric, gas, and electromagnetic wave measuring instruments). In various embodiments, the electronic device may be a combination of one or more of the above-mentioned various devices. In a certain embodiment, the electronic device may be a flexible electronic device. In addition, the electronic device according to the embodiments of the present disclosure is not limited to the above-mentioned devices and may include novel electronic devices made according to technical development.

Figure 1B:
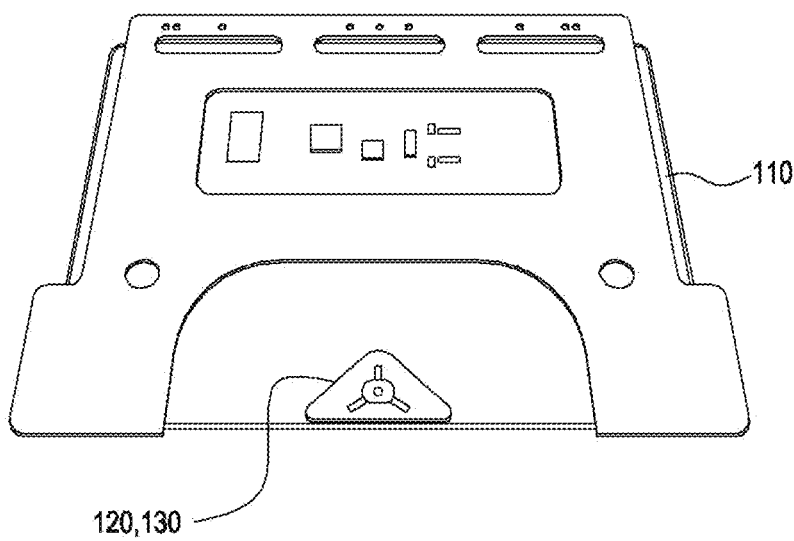
FIG. 1B is a schematic perspective view illustrating another electronic device according to various embodiments.

FIG. 1A is a schematic perspective view illustrating an electronic device 10 or 20 according to various embodiments. FIG. 1B is a schematic perspective view illustrating an electronic device 10 or 20 according to various embodiments.

Referring to FIGS. 1A and 1B, an electronic device 10 or 20 may include a display 11 or 21 configured to output a screen and to implement a contact input or a proximity input, and an input device configured to implement an input separately from an input of the display 11 or 21.

An input device according to various embodiments may be disposed in a display region or a non-display region (described later) inside the display 11 or 21 and may be placed in a device that implements an input separately from the display 11 or 21.

The display 11 or 21 is capable of implementing a contact input or a proximity input by an object, and of displaying an image according to a user environment. The display 11 or 21 may be disposed on at least one face of a main body thereof, and a touch panel and a display panel configured to display a screen on one face of the touch panel may be stacked in the display 11 or 21.

The display 11 or 21 may display an input through an object having a charge such as a hand or a module such as a digitizer pen or a stylus pen, and an output according to the input. According to various embodiments, the display 11 or 21 may receive, as an input, a continuous movement of one contact among one or more contacts. In various embodiments, the term "contact" is not limited to a direct contact of a user's body or a module, such as a stylus pen, on the display 11 or 21 or an input device that implements a separate touch input and may include a "non-contact" action (e.g., proximity). In addition, a detectable interval in the display 11 or 21 may vary depending on the performance or structure of the electronic device 10 or 20.

The display 11 or 21 may be divided into a display region where a screen is displayed and a non-display region around the periphery of the display region. In the non-display region, a circuit board on which connection lines or touch ICs may be mounted in the non-display region and may be covered by an opaque layer.

An input (hereinafter, referred to as a "main input", and corresponding to a third input unit, which will be described later) may be executed through the display 11 or 21, for example, a screen display portion, and button icons may be displayed for such a main input. That is, button icons may be provided, as visual information, to a user according to a button input through the display 11 or 21.

In addition to the side face, the non-screen region, or the display 11 or 21 of such an electronic device 10 or 20, an input device 12, 13, 22, or 23 connected to the displays 11 or 21, for example, a keyboard, a notebook computer, a touch input unit, or the like may be provided to implement an input (hereinafter, corresponding to a "first input unit" or a "first input" and referred to as a "first input"), which is different from the main input through the screen display portion. When the electronic device 10 or 20 is, for example, a portable terminal, a volume key 23, a main key 22 for inputting power or predetermined multimedia execution, or the like may be provided as a separate input device in addition to the main input of the display 11 or 21. In addition, when the electronic device 10 or 20 is, for example, a notebook computer, various types of input devices such as a qwerty key 12, a power button, or a touch input unit 13 having a function similar to that of a mouse may be separately provided in addition to the display 11 or 21.

The various types of input devices 12, 13, 22, and 23 may be provided to drive an input based on not only the contact of the screen, but also pressing or concurrently performed contact and pressing. In addition, in various embodiments, the input devices 12, 13, 22, and 23 may be configured to implement various user environments based on the intensity of a pressure together with the pressing or contact.

For example, an input unit may be disposed inside the display 11 or 21 so that an input can be implemented based on not only the contact of the display 11 or 21, but also the pressure generated upon contact. In addition, an input unit may be implemented in the input device 100 such as a side key or a main key of the electronic device 10 or 20 so as to implement not only an input based on not only pressing, but also an input according to a pressure generated upon pressing. In addition, an input unit may be provided in the touch input unit so as to implement not only an input generated according to contact and pressing, but also an input based on a pressure generated upon pressing.

Hereinafter, a touch input unit will be described as an example. However, the input device 100 according to one embodiment may include various types of input devices 100 that implement the input of the electronic device 10 or 20.

Figure 2:
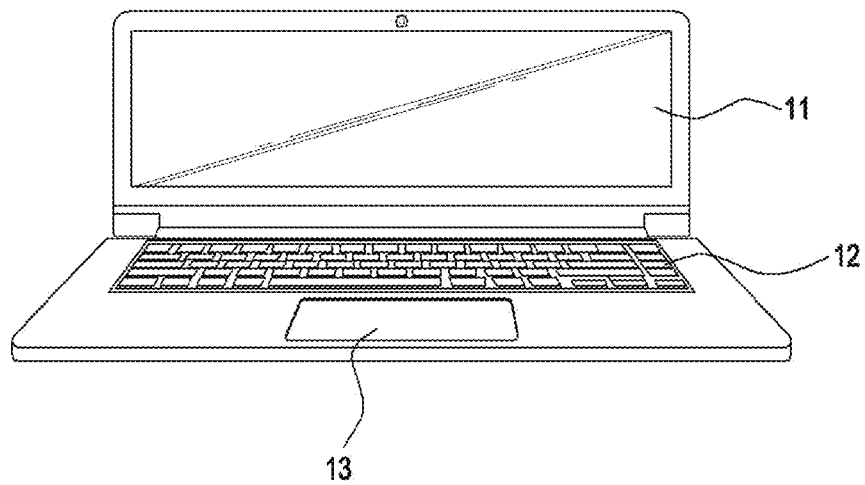
FIG. 2 is a view illustrating an input device in an electronic device according to various embodiments.
Figure 3:
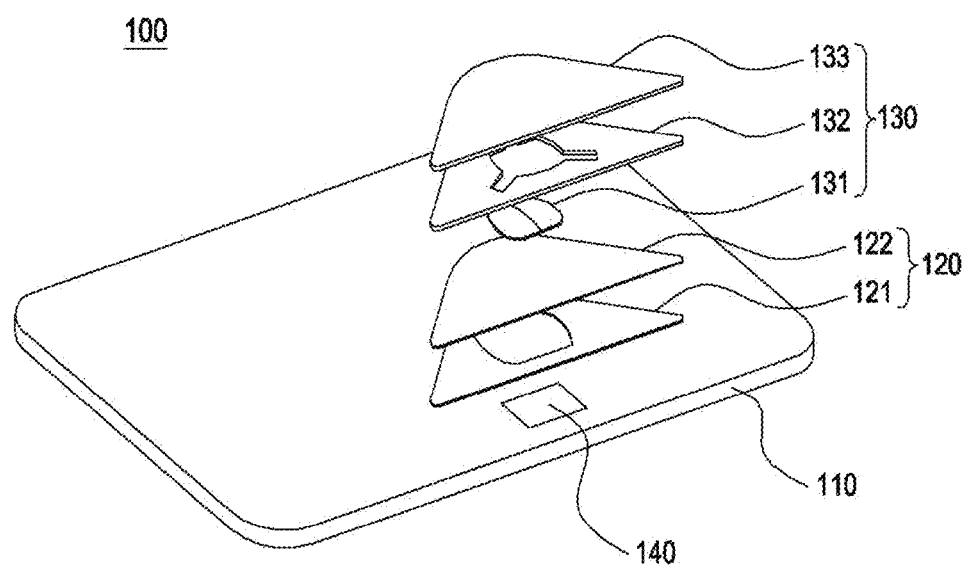
FIG. 3 is an exploded perspective view illustrating an input device in an electronic device according to various embodiments.
Figure 4A:
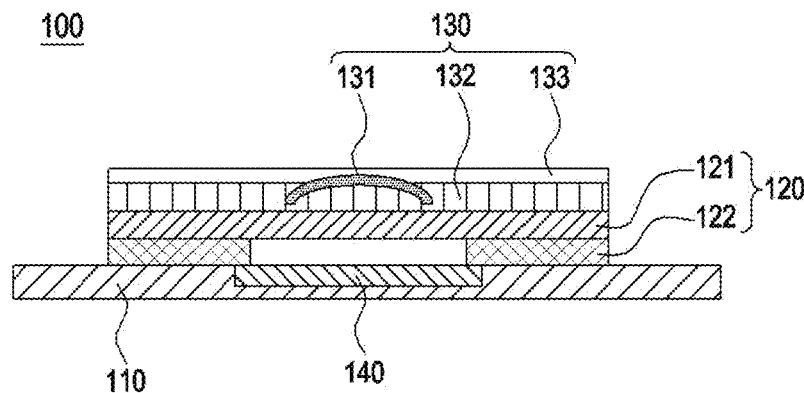
FIG. 4A is a cross-sectional view of an input device according to one embodiment in an electronic device according to various embodiments.
Figure 4B:
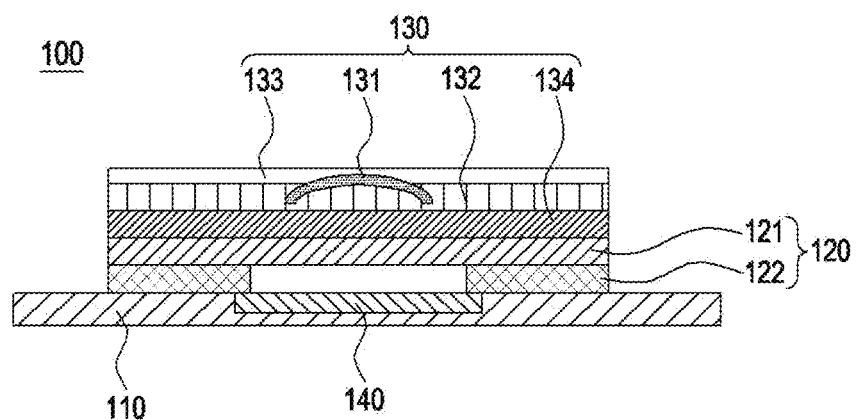
FIG. 4B is a cross-sectional view of an input device according to another embodiment in an electronic device according to various embodiments.

FIG. 2 is a view illustrating an input device 100 in the electronic device 10 or 20 according to various embodiments. FIG. 3 is an exploded perspective view of an input device 100 in the electronic device 10 or 20 according to various embodiments. FIG. 4A is a cross-sectional view of an input device according to one embodiment in an electronic device according to various embodiments. FIG. 4B is a cross-sectional view of an input device according to another embodiment in an electronic device according to various embodiments.

FIGS. 2 to 4B illustrating an input device 100 included in an electronic device (see, e.g., the electronic device 10 or 20 in FIG. 1 or FIG. 2. The reference numeral 10 or 20 is equally used below) according to various embodiments. According to one embodiment, the input device 100 may be included in at least a part of the electronic device 10 or 20 in order to obtain a user input (e.g., pressing, touch, proximity, gesture, etc.). According to one embodiment, the electronic device 10 or 20 may have an input device formed on at least one side of a touch pad to acquire a touch input, pressure, or the like applied by the user. According to one embodiment, the input device 100 may include a component such as a pressure sensor sheet or a dome switch.

According to various embodiments, the electronic device 10 or 20 may include a board 110, a first input unit of a switch (e.g., a dome switch) type (hereinafter, the first input unit will be referred to as a switch unit 130), a second input unit of a type different from the switch unit 130, e.g., a pressure-sensing type (hereinafter, the second input unit will be referred to as a "pressure module 120"), and a pressure-sensing unit 140 (which may be referred to as a "conductor", a "sensor" or a "pattern unit", and hereinafter, will be referred to as a "pattern unit").

The board 110 may have a switch unit 130 and a pressure module 120 (described later) mounted thereon and may include a touch panel to be provided with touch ICs or signal lines. Thus, it is possible to detect a contact of the user's body or a module such as a stylus pen, and to possible an input according to pressing and an input according to the intensity of pressure. The pattern unit 140 may be provided on at least one surface of the board 110 so as to receive and output signals applied according to the pressing of the switch unit 130 and the pressing of the pressure module 120 to described later.

The board 110 may be provided so as to acquire a user's touch input or to recognize a fingerprint.

The switch unit 130 may be mounted on at least one face of the board 110 and may be provided to be at least partially deformed. Upon being pressed, the switch unit 130 is brought into contact with the pattern unit 140 formed on one surface of the board 110 so that a pressing signal of the switch unit 130 may be output.

According to one embodiment, it has been described that the switch unit 130 is formed in a dome shape, but the present disclosure is not limited thereto. The shape of the switch unit 130 may be variously modified or changed to have various shapes other than the dome shape, for example, a circular shape, a rectangular shape, and etc.

According to one embodiment, the switch unit 130 may be configured as a shapeless layer in order to detect a user input. For example, the switch 130 may be configured to sense a user input based on a change in capacitance, rather than configured in the form or shape of a mechanical switch.

According to one embodiment, in the case of an input device in which the switch unit 130 is constituted by a shapeless layer different from a dome switch (for example, a dome switch described above), a user input may be sensed based on a change amount in capacitance measured by the pressure applied to the pressure module 120. According to one embodiment, when a dome switch does not exist, at least a part of the board 110 may operate flexibly so that at least a part of the board 110 may move based on a user input. In this case, based on the user input, a pressure sheet unit 121 may move to come into contact with at least a part of the pattern unit 140 by the movement of the at least a part of the board 110. Based on the contact with at least a portion of the pattern unit 140, the input device 100 may measure a pressure based on the user input.

According to one embodiment, the switch unit 130 may be a dome switch.

According to one embodiment, when the switch unit 130 is a dome switch, the dome switch may be disposed above the pressure module 120. In the switch unit, a metal dome 131, a dome sheet 132, and a sheet top 133 may be stacked in this order above the pressure module 120.

The metal dome 131 may be mounted on the pressure sheet portion 121 of the pressure module 120 to be described later and may be disposed at the position of the pattern unit 140 and seated on the dome sheet 132 such that the shape thereof can be deformed according to the pressure applied by, for example the user's pressing.

The dome sheet 132 may have a seat recess 122a formed on one face thereof, so that the metal dome 131 can be seated thereon and the shape thereof can be deformed.

According to the pressing of the metal dome 131 and the dome sheet 132, at least a partial region of the pattern unit 140 is pressed and brought into contact with the pattern unit 140 when the switch unit 130 is pressed, and an electronic signal corresponding thereto may be input to the pattern unit 140, so that an operation according to the pressing of the switch unit 130 can be implemented.

The seat top 133 may be provided to press the metal dome 131 while covering the seat recess 122a on the dome sheet 132.

In addition, as illustrated in FIG. 4B, in order to use a signal of the switch unit 130, a Flexible Printed Circuit (FPC) 134 for the signal of the switch unit 130 is placed on the pressure sheet unit 121 to be stacked so as to receive a signal (ON/OFF) of the switch unit 130.

The pressure module 120 may be provided on the switch unit 130 and the pattern unit 140 of the board 110 and between the board 110 and the switch unit 130 so as to be movable based on the user input. The pressure module 120 may be provided to determine whether or not an input signal is generated depending on the intensity of the pressure and may be provided to generate different input signals. Due to this, a user environment can be implemented with an input signal determined through a result value obtained by comparing a change amount of resistance corresponding to a predetermined reference pressure with a change amount of resistance actually measured by the pressure applied to the pressure module 120. In addition, as the switch unit 130 is pressed, the pressure module 120 is pressed. A pressure value generated in this process and a pressure value generated as the pressure module 120 is pressed may be made different from each other. Alternatively, the signal lines of the pattern unit 140, which will be described later, may be separately provided to execute a user environment according to different inputs or according to a combination of two different signals.

According to one embodiment, the pressure module 120, particularly the pattern unit 140 may be disposed in at least a part of the board 110 and may be installed on the surface of the board 110.

In addition, according to one embodiment, the pressure module 120, particularly the pattern portion 140 may be arranged to be embedded in the board 110.

The pressure module 120 may include a spacer 122 and a pressure sheet unit 121 above the pattern unit 140.

The pressure sheet unit 121 may be mounted on the pattern unit 140 and may be formed to move based on a user input. For example, upon being pressed, the pressure sheet unit 121 is brought into contact with the pattern unit 140 depending on the intensity of the pressure, and it is possible to measure the intensity of the pressure through variable resistance according to the contact between the pressure sheet unit 121 and the pattern unit 140 or the movement of the seat portion 121.

According to one embodiment, the pressure corresponding to a user input can be measured based on the contact between the pressure sheet unit 121 and the pattern unit 140 to be described later.

According to another embodiment, even if the pressure sheet unit 121 does not come into contact with the pattern unit 140 due to the movement, for example, the pressure corresponding to a user input based on a change in pressure or a change in capacitance of a medium (gas).

The pressure sheet unit 121 may include a material having a linear resistance that is variable according to a pressure generated when coming into contact with an object. For example, the pressure sheet unit 121 may include a material such as Quantum Tunneling Composite (QTC) which uses Ni particles as a conductive material. Alternatively, the pressure sheet unit 121 may be made mainly using a polymer material such as rubber and mixing conductive particles with the polymer material at a suitable ratio. When a force or a pressure is applied to the pressure sheet unit 121, the material shrinks and the particle spacing is reduced so that current can flow therein. As such a material, a conductive rubber, which uses carbon black as electrically conductive particles, a Force Sensing Resistor (FSR), or the like may be exemplified.

According to one embodiment, the pressure sheet unit 121 may be functionally connected to a sensor (not illustrated) for measuring a change amount in resistance. The sensor measures a change amount in resistance of the pressure sheet unit 121, and the electronic device may obtain a pressure value applied by the user to the input device based on the change amount.

According to one embodiment, the pressure sheet unit 121 may be set to move in a direction, which is opposite the direction corresponding to the user input.

According to one embodiment, the pressure sheet unit 121 may be set to move in a direction, which is the same as the direction corresponding to the user input.

Figure 5A:
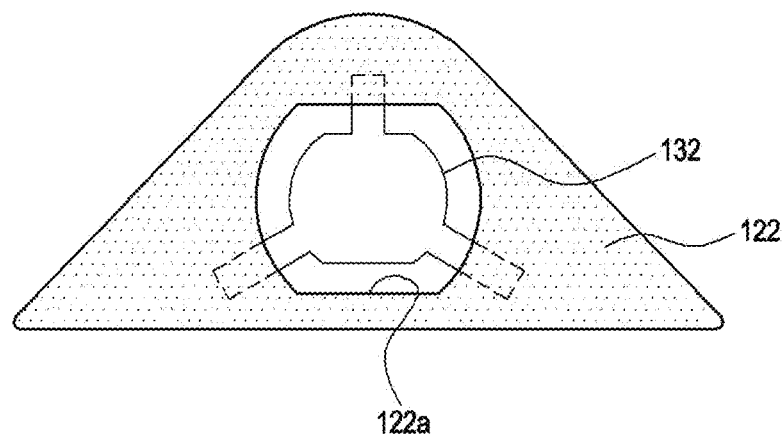
FIG. 5A is a view illustrating a stacked state of a spacer unit and a dome sheet in an electronic device according to various embodiments.
Figure 5B:
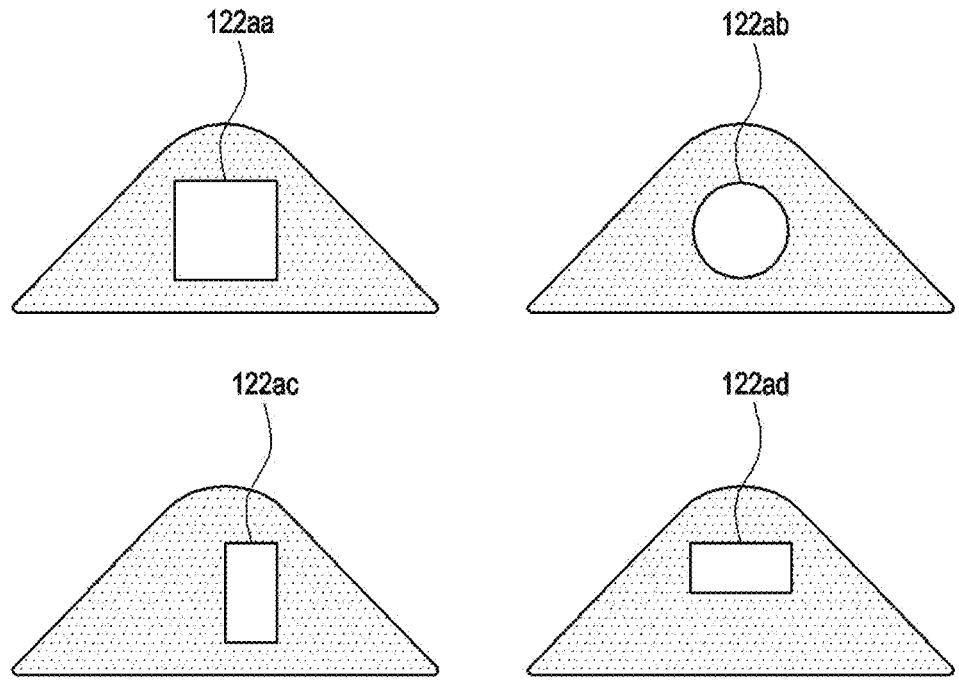
FIG. 5B is a view illustrating various shapes of a seat recess formed in the spacer unit in an electronic device according to various embodiments.

FIG. 5A is a view illustrating a stacked state of the spacer unit 122 and the dome sheet 132 in the electronic device 10 or 20 according to various embodiments. FIG. 5B is a view illustrating various shapes of a seat recess 122a formed in the spacer unit 122 in an electronic device according to various embodiments.

Referring to FIGS. 5A and 5B, the spacer unit 122 may be provided so as to support the pressure sheet unit 121 to be spaced apart from the pattern portion 140 at a predetermined interval above the pattern unit 140. The spacer unit 122 according to an embodiment of the present disclosure may be made of, for example, a silicon material. However, without being limited thereto, the spacer unit 122 may be made of a material including urethane. In addition, the shape or position of the seat recess 122a may be variously modified or changed such that the change in pressure value according to the pressing of the spacer unit 122 can be adjusted. For example, the shape of the seat recess 122a formed in the spacer unit 122 may be an oval shape 122a (see FIG. 5A), a square shape 122aa, 122ac, or 122ad (see FIGS. 5B(a), 5B(c), and 5B(d)), a circular shape (see FIG. 5B(b)), and the like, and the position of the seat recess 122a formed in the spacer unit 122 may be located at the center of the spacer unit 122 (see FIG. 5A and FIGS. 5B(a) and 5B(b)) or may be biased to one side in the spacer unit 122 (see FIG. 5A and FIGS. 5B(c) and 5B(d)). As described above, the shapes of the spacer unit 122 and the seat recess 122a of the spacer unit 122 may be configured in various shapes at various positions in order to control the change in pressure value.

Figure 6:
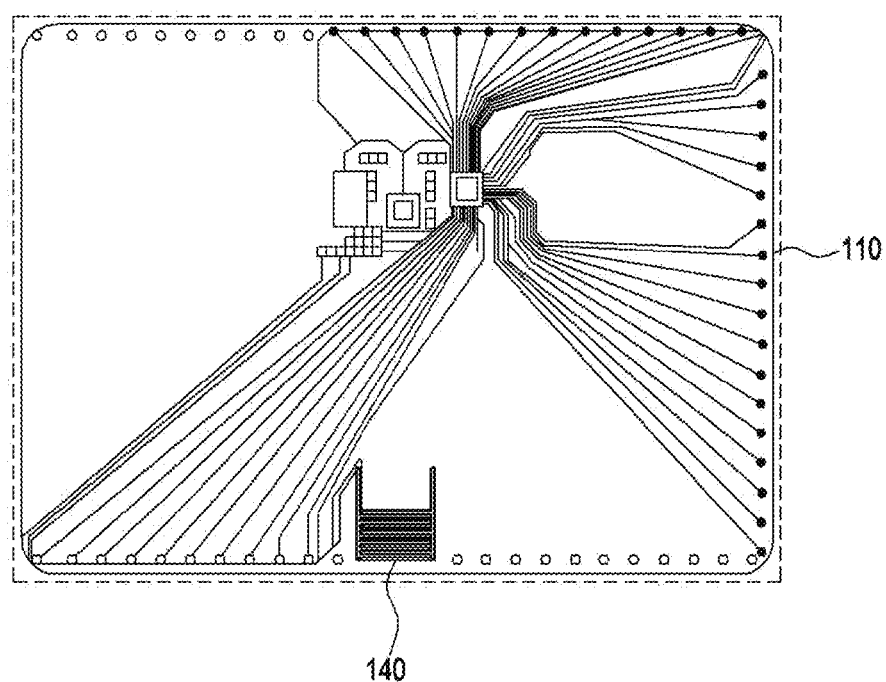
FIG. 6 is a view illustrating a board in an electronic device according to various embodiments.

FIG. 6 is a view illustrating a pattern unit 140 formed on the board 110 in the electronic device 10 or 20 according to various embodiments.

Referring to FIG. 6, a pattern unit 140 (which is also referred to as a "conductor" or a "sensor", and hereinafter will be referred to as a "pattern unit") may be provided on one surface of the board 110 and may be provided so as to acquire a user touch input or to recognize a fingerprint. For example, at least one of the pressure module 120 and the switch unit 130 is disposed on the pattern unit 140 provided on one surface of the board 110. The pattern unit 140 may sense the driving of at least one of the switch unit 130 and the pressure module 120 may be sensed, and may generate a signal caused thereby, for example, a signal through a variable value of a contact signal and a resistance. That is, the pattern unit 140 may be embedded in the board or the surface of the board in order to sense the pressure, and may detect the magnitude, position, or the like of the pressure generated in the pressure module 120 according the pressing.

The pattern unit 140 according to various embodiments may be formed symmetrically or asymmetrically. In various embodiments, it is described that the pattern unit 140 is provided in a predetermined shape, for example, a symmetrical or asymmetric shape, but it is not limited thereto, as an example, and may be provided to sense a pressure based on various types of inputs, for example, a temperature change, a force change, a capacitance change, and the like.

The pattern unit 140 according to various embodiments can be described based on, for example, two embodiments.

Figure 7A:
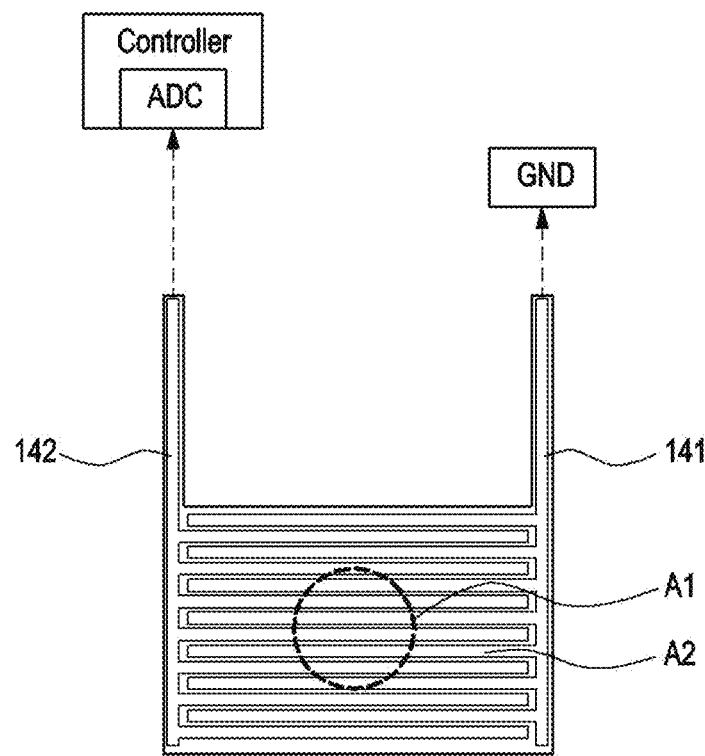
FIG. 7A is a view illustrating a pattern unit according to one embodiment in an electronic device according to various embodiments.
Figure 7B:
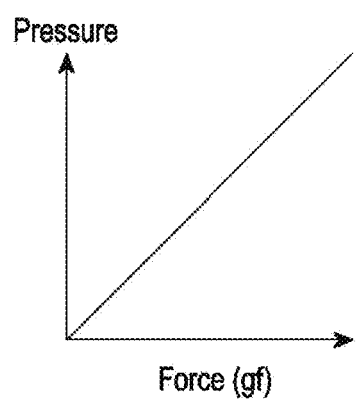
FIG. 7B is a view illustrating an output according to a pressure of a pattern unit according to one embodiment in an electronic device according to various embodiments.

FIG. 7A is a view illustrating a pattern unit 140 according to one embodiment in the electronic device 10 or 20 according to various embodiments. FIG. 7B is a view illustrating an output according to pressing of the pattern unit 140 according to one embodiment in the electronic device 10 or 20 according to various embodiments.

Referring to FIGS. 7A and 7B, the pattern unit 140 according to one of various embodiments may include a pattern shape. For example, the pattern unit 140 may have one ground line 141 and one output line 142, which are formed symmetrically or asymmetrically with each other. In addition, the ground line 141 and the output line 142 may be disposed to intersect with each other in a region where the switch unit 130 and the pressure module 120 are to come into contact with each other.

The portion where the ground line 141 and the output line 142 are disposed to intersect with each other may be divided into a first region A1 and a second region A2 around the first region A1. The first region A1 is brought into contact with the switch unit 130 according to the deformation of the switch unit 130 (e.g., when the switch unit 130 is provided as a dome switch and the dome switch is pressed) so as to sense the deformation of the switch unit 130 and the second region A2 is brought into contact with the pressure module 120 or is made to be variable in resistance according to a deformation occurring in the pressure module 120 (e.g., when the switch unit 130 is provided as a dome switch and before the dome switch is pressed).

According to an embodiment, the ground line 141 and the output line 142 may be disposed to intersect with each other or to be symmetrical or asymmetrical with each. However, the present disclosure is not limited thereto and may be embodied in various forms.

According to one embodiment, the pattern unit 140 may include a pressure sensor capable of sensing a pressure based on a contact area that is in contact with at least one face of the pressure module 120.

According to one embodiment, the pressure module 120 may include a pressure sensor capable of sensing a pressure based on a temperature change, a force change, a capacitance change, and the like.

As the user presses the input device 100, the pressure module 120 stacked close to the pattern unit 140 may be brought into contact with the pattern unit 140 at the pressed position in the second region A2. Accordingly, it is possible to detect the intensity of the pressure through the contact with the pattern unit 140 or the variable resistance value according to the intensity of the pressure, and to execute the user environment accordingly. Further, when a pressure equal to or higher than a certain level is applied, the switch unit 130 can be deformed. The deformation of the switch unit 130 occurs, the portion of the pressure sheet unit 121, which is pressed by the switch unit 130, is brought into contact with the pattern unit 140 of the first region A1 and the pattern portion 140 is able to output an input value according to the contact, in which an output value according to a pressure different from the above-mentioned pressure may be generated and a user environment different from the previous user environment may be executed accordingly.

For example, the contact area, time, direction, position, or the like with respect to the pattern unit 140 may be changed in various forms based on the magnitude, direction, position, intensity, or the like of the user input, and the electronic device 10 or 20 is able to perform various operations each corresponding to a change amount in the pattern unit 140. Further, the electronic device 10 or 20 may obtain information on the magnitude, direction, degree, position, or the like of the pressure corresponding to the user input based on the change amount in the pattern unit 140.

In addition, the thickness of the pattern unit 140 may be 0.2 mm to 0.5 mm, the distance between the patterns in the pattern unit 140 may be 0.1 mm to 0.3 mm. A characteristic such as the intensity, position, or the like of a pressure may be adjusted by adjusting the distance between the patterns in the pattern unit 140. Although numerical values of the thickness of the pattern unit 140 of the present disclosure and the distance between the patterns in the pattern unit 140 have been described above by way of an example, the present disclosure is not limited thereto. For example, the numerical values of the thickness of the pattern unit 140 and the distance between the patterns in the pattern unit 140 may also be adjusted to other values in order to adjust the pressure sensitivity of the pattern unit 140. Accordingly, when a user input, e.g., a pressure, is applied to the first region A1 of the pattern unit 140, the magnitude and position of the pressure can be sensed according to the distance between the patterns, and it becomes possible to measure the force that is increased in proportion to the magnitude of the pressure and depending on the position of the pressure.

As described above, among two signal lines of the pattern unit 140, the ground line 141, the output line 142, the ground line 141 may be connected to a ground, and the output line 142 may be connected to an ADC of a controller. Thus, when the switch unit 140 is pressed by a pressure, the resistance value is changed so that it becomes possible to measure the pressure value at the ADH.

A user environment different from the previous user environments may be executed through a combination of a pressure value detected between the pressure module 120 and the second region A2 and a pressure value detected between a portion of the pressure sheet unit 121 pressed as the switch unit 130 is pressed and the first region A1.

Figure 8A:
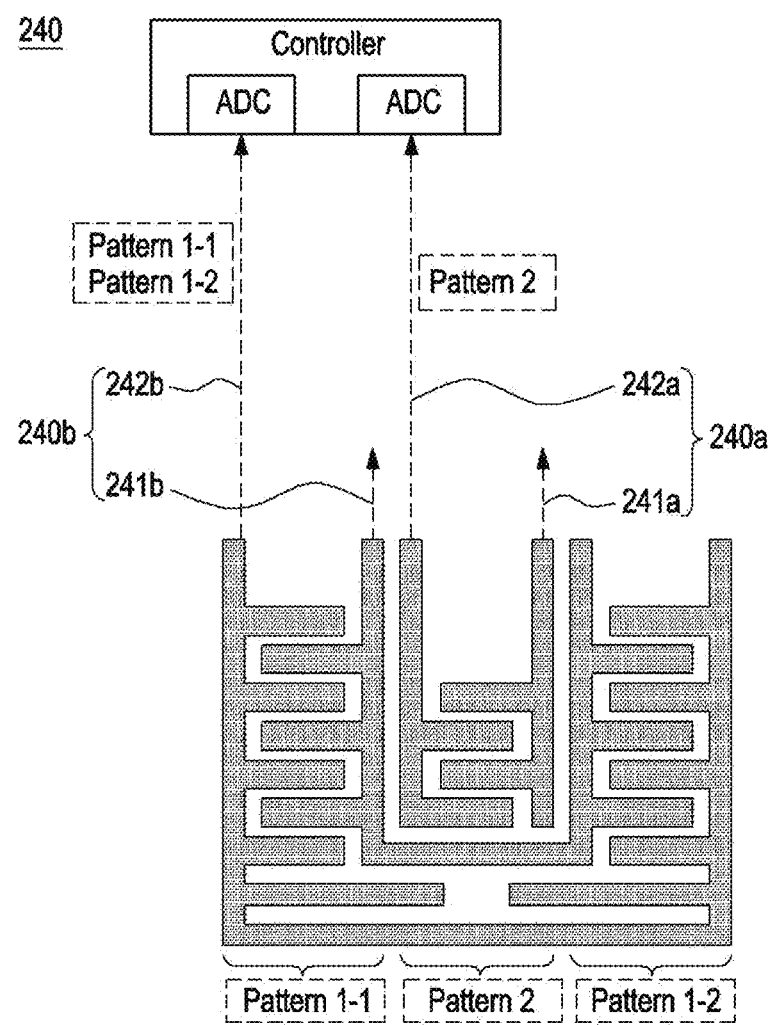
FIG. 8A is a view illustrating a pattern unit according to another embodiment in an electronic device according to various embodiments.
Figure 8B:
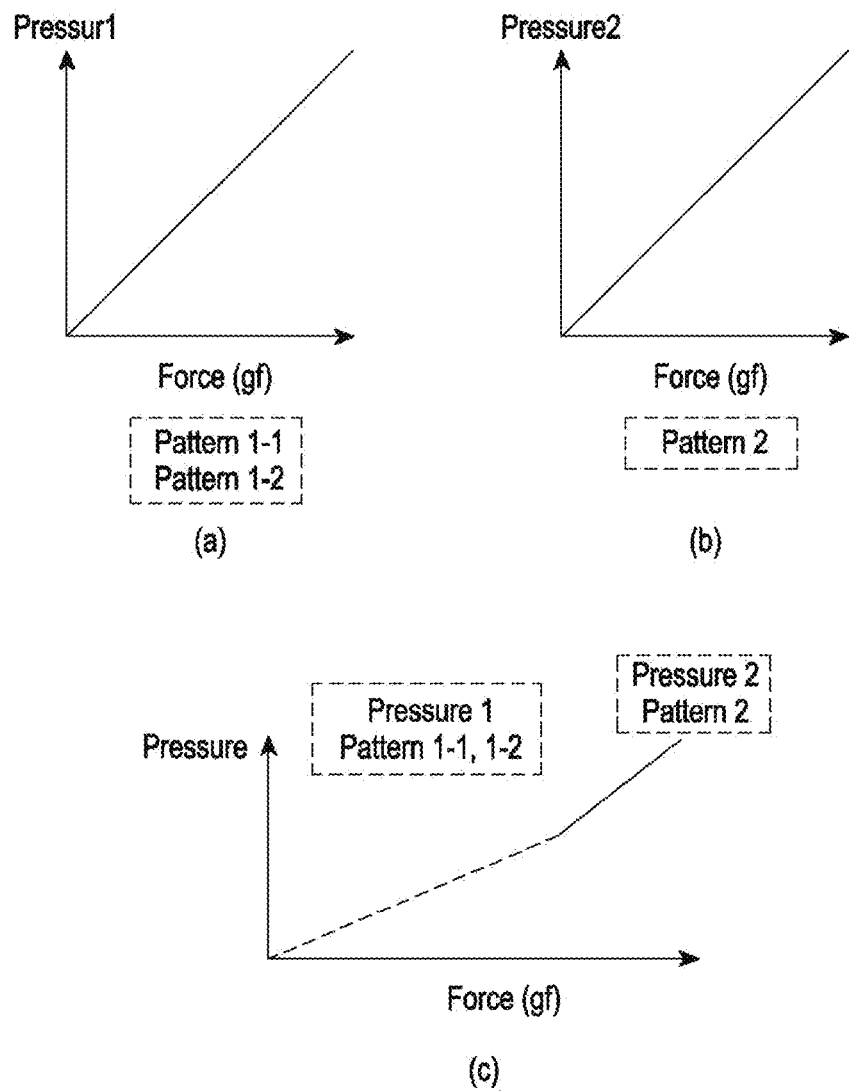
FIG. 8B is a view illustrating an output according to a pressure of a pattern unit according to another embodiment in an electronic device according to various embodiments.

FIG. 8A is a view illustrating a pattern unit 140 according to another embodiment in the electronic device 10 or 20 according to various embodiments. FIG. 8B is a view illustrating an output according to pressing of the pattern unit 140 according to another embodiment in the electronic device 10 or 20 according to various embodiments.

Referring to FIGS. 8A and 8B, the pattern unit 240 according to another embodiment of the present disclosure may include a first pattern unit 240a configured to sense the pressing of the switch unit 130, and a second pattern unit 240b configured to sense the pressing of the pressure module 120 before the switch unit 130 is pressed by the neighboring periphery of the first pattern unit 240a. According to one embodiment, the switch unit 130 is not limited to a dome-shaped switch, and a user's pressing may be applied through a flexible material or the like, which is configured in the form of a switch which does not include a dome-shaped switch or in a switchless form. For example, when the dome-shaped switch is not provided, the flexible material may replace the dome-shaped switch. The first pattern unit 240a may have one ground line 241a and one output line 242a which may be formed symmetrically or asymmetrically with each other, and a portion in which the ground line 241a and the output line 242a are disposed to symmetrically or asymmetrically intersect with each other may be formed by a portion which is in contact with the switch unit 130. In various embodiments, it has been described that the pattern unit 240 is formed symmetrically, but the present disclosure is not limited thereto. The shape of the pattern unit 140 may be freely changed or modified so long as the changed or modified shape is able to sense a pressure occurrence position, the magnitude of the pressure, or the like when the pressure module 120 is pressed.

Separately from the first unit 240a, the second pattern unit 240b may have one ground line 241b and one output line 242b which may be formed symmetrically or asymmetrically with each other, and a portion in which the ground line 241b and the output line 242b are disposed to symmetrically or asymmetrically intersect with each other may be formed by a portion which is in contact with the pressure module 120 or is made to be variable in resistance according to the deformation occurring in the pressure module 120.

As the user presses the input device 100, the pressure module 120 stacked close to the pattern unit 140 may be brought into contact with the second pattern unit 240b at the pressed position in the second pattern unit 240b. Accordingly, it is possible to detect the intensity of the pressure through the contact with the second pattern unit 240b or the variable resistance value according to the intensity of the pressure, and to execute the user environment accordingly. Further, by applying a pressure different from the above pressure, the switch unit 130 can be deformed. When the switch unit 130 is deformed, the lower end of the switch unit 130 comes into contact with the pressure sheet unit 121 on the first pattern unit 240a, an input value according to the contact of the first pattern unit 240a may be output, an output value according to contact between the first pattern unit 240a and the pressure sheet unit 121 provided at the lower end of the switch unit 130 may be generated, and a user environment different from the previous user environment may be executed according to the above result value.

A user environment different from the previous user environments may be executed through a combination of a pressure value detected between the pressure module 120 and the second pattern unit 240b and a pressure value detected between the switch unit 130 and the first pattern unit 240a.

In addition, as described above, even in one embodiment of the present disclosure, the thickness of the pattern unit 240 may be 0.2 mm to 0.5 mm, the distance between the patterns in the pattern unit 240 may be 0.1 mm to 0.3 mm. A characteristic such as the intensity, position, or the like of a pressure may be adjusted by adjusting the distance between the patterns in the pattern unit 240. Although numerical values of the thickness of the pattern unit 140 of the present disclosure and the distance between the patterns in the pattern unit 140 have been described above by way of an example, the present disclosure is not limited thereto. For example, the numerical values of the thickness of the pattern unit 140 and the distance between the patterns in the pattern unit 140 may also be adjusted to other values in order to adjust the pressure sensitivity of the pattern unit 140. Accordingly, when a user input, e.g., a pressure, is applied to the first region A1 of the pattern unit 240, the magnitude and position of the pressure can be sensed according to the distance between the patterns, and it becomes possible to measure the force that is increased in proportion to the magnitude of the pressure and depending on the position of the pressure.

Also, as mentioned above, each of the pattern units 240 may include two signal lines. Specifically, the first pattern unit 240a may be provided with a first ground line 241a connected to a ground and a first output line 242a connected to the ADC of a controller. In addition, the second pattern unit 240b may be provided with a second ground line 241b connected to the ground and a second output line 242b connected to the ADC of the controller. In addition, the first output terminal 242a of the first pattern unit 240a, which is disposed relatively inwardly, and the second output terminal 242b of the second pattern unit 240b, which is disposed relatively outwardly, may be respectively connected two different ADC ports, so that respective pressure values may be calculated (see FIGS. 8B(a) and 8B(b)) and the respective pressure values may also be calculated as one pressure value (see FIG. 8B(c)).

Figure 9:
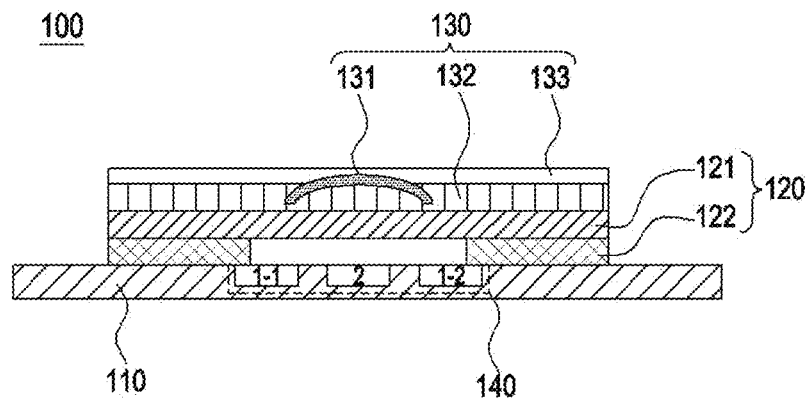
FIG. 9 is a cross-sectional view illustrating a pattern unit according to a pressure module and a switch unit in an electronic device according to various embodiments.
Figure 10:
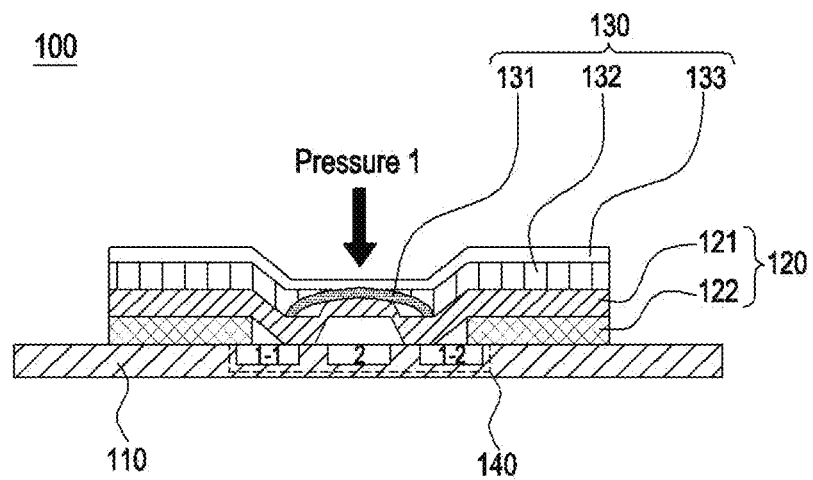
FIG. 10 is a cross-sectional view illustrating an input device pressed based on a first user input in an electronic device according to various embodiments.
Figure 11:
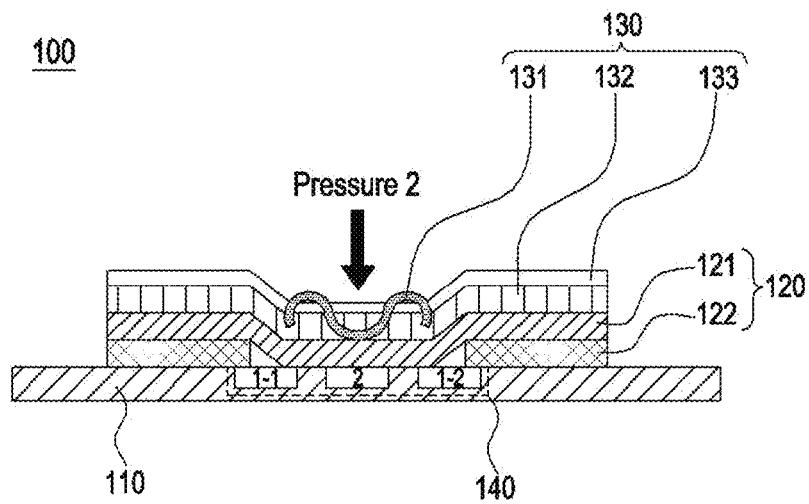
FIG. 11 is a cross-sectional view illustrating an input device pressed based on a second user input in an electronic device according to various embodiments.
Figure 12:
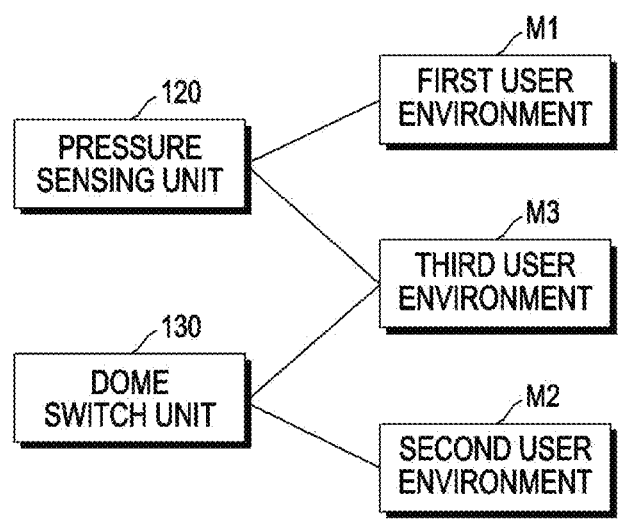
FIG. 12 is a block diagram schematically illustrating a user environment executed as an input device is pressed in an electronic device according to various embodiments.

FIG. 9 is a cross-sectional view a region of the pattern unit 140 according to the pressure module 120 and the switch unit 130 in the electronic device 10 or 20 according to various embodiments. FIG. 10 is a cross-sectional view illustrating an input device 100 pressed based on a first user input in the electronic device 10 or 20 according to various embodiments. FIG. 11 is a cross-sectional view illustrating an input device 100 pressed based on a second user input in the electronic device 10 or 20 according to various embodiments. FIG. 12 is a block diagram schematically illustrating a user environment executed as an input device 100 is pressed in the electronic device 10 or 20 according to various embodiments.

Referring to FIGS. 9 to 12, according to one embodiment of the present disclosure, the pressure sheet unit 121 may be set to move in a direction, which is the same as the direction corresponding to the user input. That is, when a user input is applied to the input device, the switch unit may be deformed in the same direction as the direction of the user input, and as a result, the pressure sheet unit 121 moves in the same direction as the direction of the user input to be brought into contact with or to be proximate to the pattern unit 140, thereby making the resistance variable.

For example, the pattern unit 140 may be divided into a portion (e.g., the first region A1 or first pattern unit 240a described above) that senses the pressure after the switch unit 130 is pressed, and a portion (e.g., the second region A2 or second pattern unit 240b) that senses a change in contact or resistance according to the pressing of the pressure module 120 before the switch unit 130 is pressed.

The user may press the input device 100 based on the first input. The first user input has a pressure value at which the switch unit 130 is not pressed, and the pressure module 120 may be deformed by the pressing based on the first user input. Thus, the pressure module 120 may be brought into contact with or may be proximate to the pattern unit 140 in a portion disposed around the switch portion 130, thereby making resistance variable. Accordingly, the pattern unit 140 is capable of detecting the intensity of the pressure, and the electronic device 10 or 20 is capable of implementing a first user environment according to a detected value.

The user may press the input device 100 based on the second input. The second user input has a pressure value at which the switch portion 130 is pressed, and at least a part of the switch portion 130 may be elastically deformed. According to the deformation of the switching unit 130, the switch unit 130 may be brought into contact with the pattern unit 140 corresponding to the position of the pressure sheet under the switch unit 130, so that it is possible to detect a corresponding detection value. The electronic device 10 or 20 is able to implement the second user environment through the value detected in the pattern unit 140.

Thus, the pattern unit 140 disposed on the surface of the board 110 is configured as "Pattern 1-1", "Pattern 1-2", or "Pattern 2" and a pressure is applied thereto, a signal according to a change in position and area where at least a part of the switch unit 130 touches the pattern unit 140 may be separated. When the initial pressure applied to the switch unit 130 is Pressure 1 (a value smaller than a click force required for clicking), as illustrated in FIG. 10, a first deformation occurs in the pressure sheet unit 121 according to the pressure of the switch unit 130, and the switch unit 130 is brought into contact with the portions of "Pattern 1-1" and "Pattern 1-2" of the pattern unit 140 first, so that the pressure can be calculated. In addition, when the initial pressure applied to the switch unit 130 is Pressure 2 (a value larger than a click force required for clicking), as illustrated in FIG. 11, a second deformation occurs in the pressure sheet unit 121 according to the pressure of the switch unit 130, and the switch unit 130 is also brought into contact with "Pattern 2" of the pattern unit 140, so that the pressure can be calculated for each of the patterns. When the switch unit 130 is pressed at a pressure value exceeding the click force, the outer side (the portions of "Pattern 1-1" and "Pattern 1-2") and the inner side (the portion of "Pattern 2") of the switch unit 130 are pressed together so that two pressure values can be separately received and calculated and can be calculated as one pressure value by combining these values.

In this case, by handling the signal in such a manner that the switch unit 130 is pressed from the portion where the pressure value appears, the signal can be expressed before and after the switch unit 130 is pressed.

As described above, in various embodiments of the present disclosure, the pattern unit 140 may be divided into outer patterns (the portions of "Pattern 1-1" and "Pattern 1-2") where the switch unit 130 comes into contact with the outside of the pattern unit 140 and an inner pattern (the portion of "Pattern 2"). It is described that the pattern unit 140 is divided as described above based on the pressing of the switch unit 130 by way of an example, but the present disclosure is not limited thereto. For example, according to the shape of the inner metal dome 131 of the switch unit 130, the pattern unit 140 may be divided into two portions, three portions, or more, and may be changed such that the pattern of each divided portion individually receives a pressure value.

Further, through a combination of detection values generated in the pressure module 120 and the pattern unit 140 according to the first user input and the detection values generated in the switch unit 130 and the pattern unit 140 according to the second user input, it is possible to execute a third user environment M3 different from the previous user environments.

Figure 13:
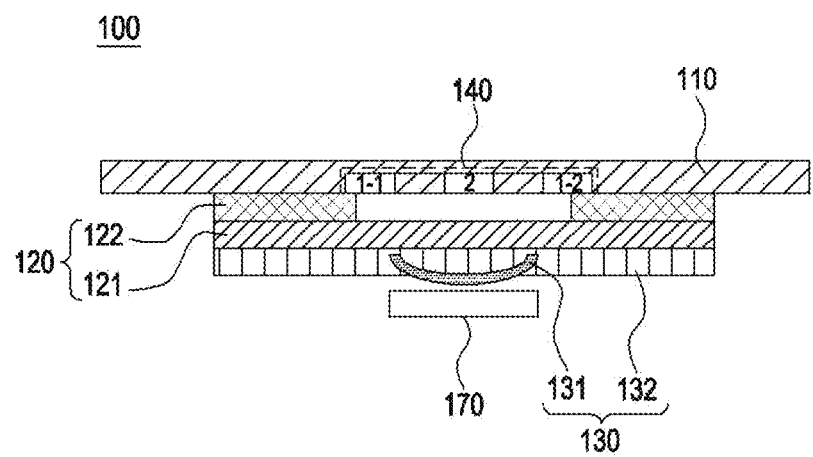
FIG. 13 is a view illustrating another mounting form of an input device in an electronic device according to various embodiments.

FIG. 13 is a view illustrating another mounting form of an input device in an electronic device according to various embodiments.

Referring to FIG. 13, the electronic device 10 according to one embodiment may include a board 110, a first input unit of a switch (e.g., a dome switch) type (hereinafter, the first input unit will be referred to as a switch unit 130), a second input unit of a type different from the switch unit 130, e.g., a pressure-sensing type (hereinafter, the second input unit will be referred to as a "pressure module 120"), and a pressure-sensing unit 140 (which may be referred to as a "conductor", a "sensor" or a "pattern unit", and hereinafter, will be referred to as a "pattern unit"). Descriptions for respective components similar to those of the components of the electronic devices described above will be omitted.

An electronic device according to one embodiment is different from the previously described electronic devices in terms of the stacked state. The pressure sheet unit 121 of the pressure sensing unit 120 of the electronic device 10 according to one embodiment may be set to move in the direction opposite to the direction corresponding to the user input.

For example, in the electronic device 10 according one embodiment, the board 110 may be disposed at the uppermost side, and the pattern unit 140 may be disposed on one face (the bottom face) of the board 110, a spacer 122 and the pressure sheet unit 121 may be stacked in this order downward from the pattern unit 140. In addition, the switch unit 130 is mounted on the lowermost side of the pressure sheet unit 121 and the switch unit 130 may be disposed to face a separate structure 170 (e.g., a structure 170 formed by a bottom surface, a pressing protrusion, or the like) according to the occurrence of an external pressure and to move in response to the user's pressure.

In addition, the switch unit 130 is mounted on the bottom face of the board 140. The switch unit 130 is pressed by the structure disposed on the bottom face of the board 140 in response to the user's pressure generated on the upper side of the board 140 so that a pressing signal can be output.

Figure 14:
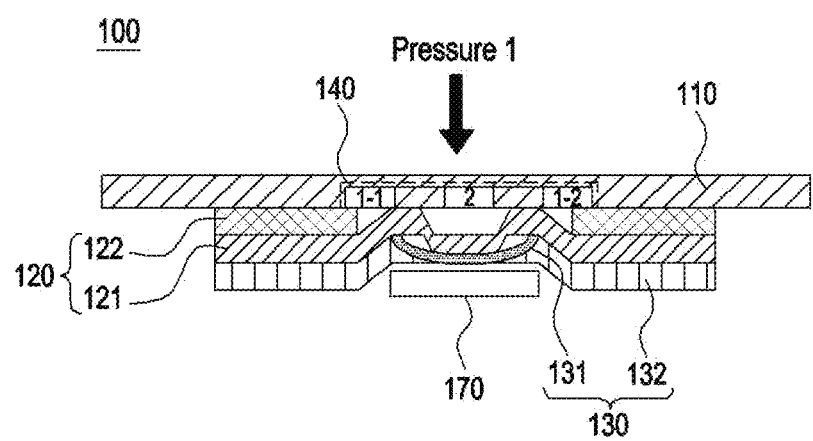
FIG. 14 is a view illustrating a driving state of an input device according to another embodiment in the electronic device according to various embodiments of the present disclosure.
Figure 15:
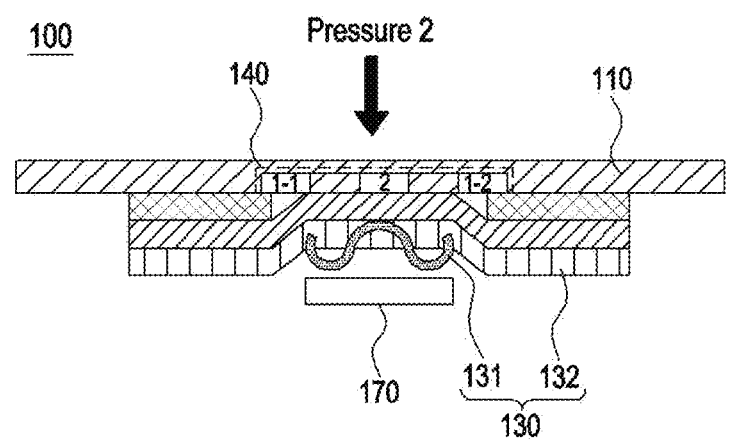
FIG. 15 is a view illustrating another driving state of an input device according to another embodiment in the electronic device according to various embodiments of the present disclosure.

FIG. 14 is a view illustrating a driving state of an input device according to another embodiment in the electronic device according to various embodiments of the present disclosure. FIG. 15 is a view illustrating another driving state of an input device according to another embodiment in the electronic device according to various embodiments of the present disclosure.

Referring to FIGS. 14 and 15, the pattern unit 140 may be divided into a portion (e.g., the first region A1 or first pattern unit 240a described above) that senses the pressure after the switch unit 130 is pressed, and a portion (e.g., the second region A2 or second pattern unit 240b) that senses a change in contact or resistance according to the pressing of the pressure module 120 before the switch unit 130 is pressed (see FIG. 7A).

According to one embodiment of the present disclosure, the pressure sheet unit 121 may be set to move in a direction, which is opposite the direction corresponding to the user input. That is, when a user input is applied to the input device, the switch unit may be deformed in the direction opposite the direction of the user input, and as a result, the pressure sheet unit 121 moves in the direction opposite the direction of the user input to be brought into contact with or to be proximate to the pattern unit 140, thereby making the resistance variable.

The user may press the input device 100 based on the first input. The first user input has a pressure value at which the switch unit 130 is not pressed. For example, the switch unit 130, which may be deformed by a pressure based on the first user input, may be brought into a structure 170 (see FIG. 14). Thus, the pressure module 120 may be brought into contact with or may be proximate to the pattern unit 140 in a portion disposed around the switch portion 130, thereby making resistance variable. Accordingly, the pattern unit 140 is capable of detecting the intensity of the pressure, and the electronic device 10 or 20 is capable of implementing a first user environment according to a detected value (see FIG. 12).

The user may press the input device 100 based on the second input. The second user input has a pressure value at which the switch portion 130 is pressed, and at least a part of the switch unit 130 may be elastically deformed by being pressed by the structure 170 according to the pressing. According to the deformation of the switching unit 130, the switch unit 130 may be brought into contact with the pattern unit 140 corresponding to the position of the pressure sheet under the switch unit 130, so that it is possible to detect a corresponding detection value. The electronic device 10 or 20 is able to implement the second user environment through the value detected in the pattern unit 140.

For example, the pattern unit 140 disposed on the surface of the board 110 may be divided into "Pattern 1-1", "Pattern 1-2", and "Pattern 2" and when a pressure is applied thereto, a signal according to a change in position and area where at least a part of the switch unit 130 touches the pattern unit 140 may be separated. When the initial pressure applied to the switch unit 130 is Pressure 1 (a value smaller than a click force required for clicking), as illustrated in FIG. 14, a first deformation may occur in the switch unit 130 according to the pressure, and the pressure sheet unit 121 is brought into contact with the portions of "Pattern 1-1" and "Pattern 1-2" of the pattern unit 140 first, so that the pressure can be calculated. In addition, when the initial pressure applied to the switch unit 130 is Pressure 2 (a value larger than a click force required for clicking), as illustrated in FIG. 15, a second deformation may occur in the switch unit 130 according to the pressure generated while being in contact with the structure 170, and the pressure sheet unit 121 is brought into contact with not only the portions "pattern 1-1" and "Pattern 1-2", but also the portion of "Pattern 2" of the pattern unit 140, so that the pressure can be calculated for each of the patterns. When the switch unit 130 is pressed at a pressure value exceeding the click force, the outer side (the portions of "Pattern 1-1" and "Pattern 1-2") and the inner side (the portion of "Pattern 2") of the switch unit 130 are pressed together so that two pressure values can be separately received and calculated and can be calculated as one pressure value by combining these values.

In this case, by handling the signal in such a manner that the switch unit 130 is pressed from the portion where the pressure value appears, the signal can be expressed before and after the switch unit 130 is pressed.

As described above, in various embodiments of the present disclosure, the pattern unit 140 may be divided into outer patterns (the portions of "Pattern 1-1" and "Pattern 1-2") where the switch unit 130 comes into contact with the outside of the pattern unit 140 and an inner pattern (the portion of "Pattern 2"). It is described that the pattern unit 140 is divided as described above based on the pressing of the switch unit 130 by way of an example, but the present disclosure is not limited thereto. For example, according to the shape of the inner metal dome 131 of the switch unit 130, the pattern unit 140 may be divided into two portions, three portions, or more, and may be changed such that the pattern of each divided portion individually receives a pressure value.

Further, through a combination of detection values generated in the pressure module 120 and the pattern unit 140 according to the first user input and the detection values generated in the switch unit 130 and the pattern unit 140 according to the second user input, it is possible to execute a third user environment different from the previous user environments (see FIG. 13).

Figure 16:
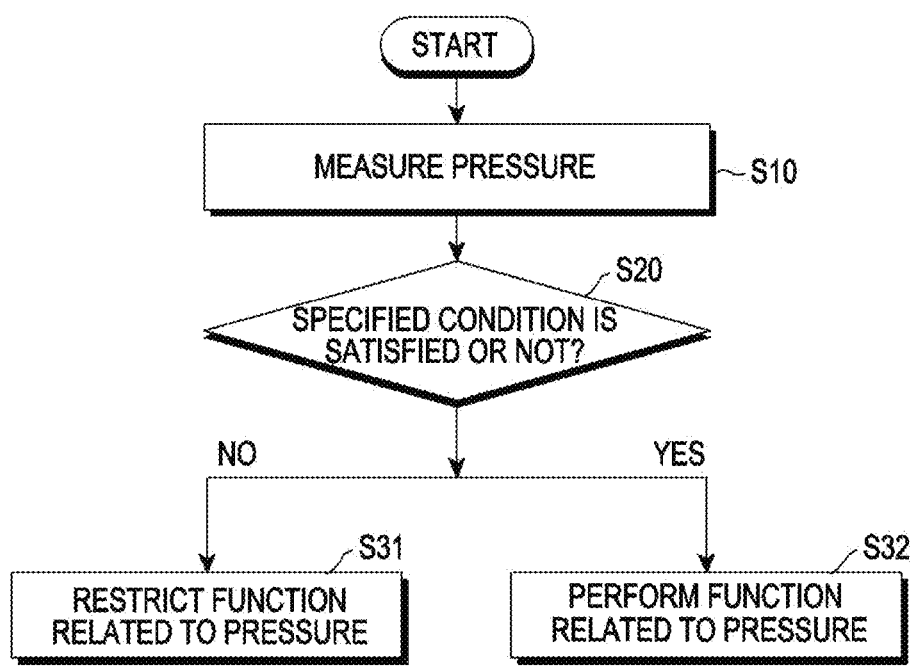
FIG. 16 is a flow chart schematically illustrating a method of acquiring a user input in an electronic device according to various embodiments.
Figure 17:
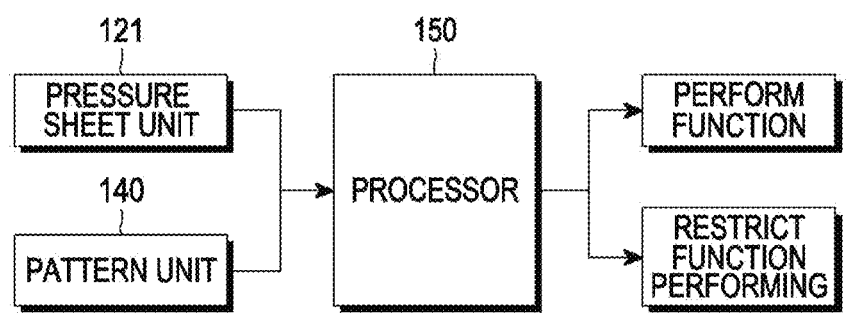
FIG. 17 is a block diagram schematically illustrating a method of acquiring a user input in an electronic device according to various embodiments.

FIG. 16 is a flow chart schematically illustrating a method of acquiring a user input in an electronic device 10 according to various embodiments. FIG. 17 is a block diagram schematically illustrating a method of acquiring a user input in an electronic device according to various embodiments.

Referring to FIGS. 16 and 17, in the method for acquiring a user input according to an embodiment of the present disclosure, the electronic device 10 having the above-described configuration and structure may be exemplified. Therefore, descriptions for components similar to those described above will be omitted.

As described above, a method for acquiring a user input according to an exemplary embodiment of the present disclosure may be based on the electronic device that includes a board 110 configured to acquire a user input, at least one pressure sheet unit 121 spaced apart from at least a partial region of the second board 110 and configured to move in response to the user input, and a processor 150.

In a method for acquiring a user input according to one embodiment, when a user input is applied to at least a partial region of the board 110, the pressure sheet unit 121 disposed in at least a partial region of the board 110 is moved by the shape deformation in response to the user input. When the pressure sheet unit 121 is proximate to or comes into contact with the pattern unit 140 according to the movement of the pressure sheet unit 121, various types of reactions may be generated. For example, no user input may exist or no reaction may exist between the pressure sheet unit 121 and the pattern unit 140 with respect to a user input that does not exceed a predetermined level, and a change in resistance, capacitance, or temperature may be generated between the pressure sheet unit 121 and the pattern unit 140 in response to the user input that exceeds a predetermined level (S10). That is, depending on the presence or absence of a user input, a change may occur in capacitance, resistance, or temperature between the pressure seat portion 121 and the pattern portion 140, and the pressure corresponding thereto may be measured.

The processor 150 may control the input operation of the electronic device depending on whether or not a specified condition is satisfied through the detected value of an introduced pressure (S20). For example, depending on whether or not a variable value in the resistance, capacitance, or temperature, which is generated when the pattern unit 140 and the pressure sheet unit 121 are proximate to each other or are brought into contact with each other, exists, the processor 150 may implement an operation of measuring a pressure corresponding to the user input (S32) or may limit a function related to the pressure (S31), based on the driving performed depending on whether or not the movement of the pressure sheet unit 121 exists.

That is, the processor 150, which receives information as to whether or not a variable value exists or the like, may determine whether or not the pressure satisfies the specified condition (S20) and may perform control to drive various user environments of the electronic device 10 according to the user input. For example, when a variable value (e.g., a value that varies by a pressure according to a user input) delivered to the processor 150 satisfies a specified condition, the processor 150 may perform control to execute an operation of performing a function related to the pressure such that a function (user environment) set based on the pressure can be executed (S32).

For example, when the initial pressure generated according to the user input is Pressure 1 (a value smaller than a click force required for clicking), a first deformation occurs in the pressure sheet unit 121 according to the pressure of the switch unit 130, and the switch unit 130 is brought into contact with the portions of "Pattern 1-1" and "Pattern 1-2" of the pattern unit 140 first, so that the pressure can be calculated (see FIG. 10 or FIG. 14). When the initial pressure applied according to the user input is Pressure 2 (a value larger than a click force required for clicking), a second deformation occurs in the pressure sheet unit 121 and the switch unit 130 is also brought into contact with the portion of "Pattern 2" of the pattern unit 140, so that the pressure can be calculated for each pattern (see FIG. 11 or FIG. 15). Upon being pressed with a pressure value exceeding a click force, the processor 150 may perform control to implement an operation related to various pressures. In addition, upon being pressed with a pressure value exceeding a click force, the processor 150 may separately receive and calculate two input values applied to an outer side (the portions of "Pattern 1-1" and "Pattern1-2") and an inner side (the portion of "Pattern 2") according to the contact between the pressure sheet unit 121 and the pattern unit 140, and the processor 150 may combine and calculate these values as one pressure value so as to control an operation related to the pressure.

For example, an operation that performs a function related to a pressure may include an operation of changing the magnitude of the volume corresponding to the pressure, and the like. In addition, the operation of performing the function may include an operation of changing the size, position, or color of at least one graphic object such as a user experience (UX), a user interface (UI), a menu, or the like corresponding to the pressure.

In addition, when the pressure does not satisfy the specified condition, an operation of refraining from performing (e.g., restricting) of the function using the processor 150 (S31).

For example, in the case in which the processor 150 controls the electronic device to perform the first user environment M1 according to detection through the pressure sheet unit 121 and the pattern unit 140, the processor 150 may control the electronic device to restrict performing of a function according to the remaining second user environment M2 or third user environment M3.

In addition, in the case in which the processor 150 controls the electronic device 10 to perform the second user environment M2 according to detection through the pressure sheet unit 121 and the pattern unit 140, the processor 150 may control the electronic device to restrict performing of a function according to the remaining first user environment M1 or third user environment M3.

Unlike this, in the case in which the processor 150 controls the electronic device 10 to perform the third user environment M3 according to detection through the pressure sheet unit 121 and the pattern unit 140, the processor 150 may control the electronic device to restrict performing of a function according to the remaining first user environment M1 or second user environment M2.

It has been described that, in the present disclosure, a user environment is divided into the first user environment M1, the second user environment M2, and the third user environment M3 each other according to the method for acquiring a user input. However, the electronic device 10 is able to set various user environments in accordance with the intensity of pressure, the occurrence position of pressure, or the like according to the pressure sheet unit 121 and the pattern unit 140, the presence or absence of the input of the switch unit 130, and the like.

An electronic device according to various embodiments is able to control functions corresponding to various applications executed therein based on a change in pressure. For example, as the pressure value is increased, the electronic device is able to increase the moving speed of pictures existing in a gallery application executed therein or to increase the web-page turning speed or web-page scroll speed in a web browser application. According to one embodiment, it is possible to adjust the volume of the electronic device in response to the change in the pressure.

An electronic device according to various embodiments may include: a board configured to acquire a user input; at least one pressure sheet unit spaced apart from at least a partial region of the board and configured to move in response to the user input; and a pressure sensing unit disposed in the partial region of the board and set to measure a pressure corresponding to the user input at least based on the movement of the pressure sheet unit.

In the electronic device according to various embodiments, the board may acquire a touch input of the user or may recognize a fingerprint.

In the electronic device according to various embodiments, the pressure sensing unit may include a conductor forming a pattern or at least one sensor.

In the electronic device according to various embodiments, the pressure sensing unit may be set to sense the touch input in a same direction, which is the same as the direction corresponding to the user input, and to acquire the pressure in a direction, which is opposite the direction corresponding to the user input.

In the electronic device according to various embodiments, the pressure sheet unit may be set to move in a direction, which is opposite the direction corresponding to the user input.

In the electronic device according to various embodiments, the pressure sheet unit may be set to move in a direction, which is the same as the direction corresponding to the user input.

In the electronic device according to various embodiments, a spacer unit may be further stacked between the pressure sheet unit and the pressure sensing unit.

In the electronic device according to various embodiments, the pressure sensing unit may measure the intensity of the pressure through a change in resistance, capacitance, or temperature according to the contact with the pressure sheet unit or the movement of the pressure sheet unit.

In the electronic device according to various embodiments, the electronic device may further include a switch unit in which at least a portion of the shape is deformed based on the user input.

In the electronic device according to various embodiments, the switch unit may include: a metal dome mounted on the pressure seat section and disposed at a position of the pressure sensing unit, so that the metal dome is deformed in at least a part of the shape thereof based on the user's input; a dome sheet on which the metal dome is seated; and a sheet top stacked on the dome sheet unit.

In the electronic device according to various embodiments, the pressure sensing unit may output a pressure value corresponding to at least one of a first input corresponding to the deformation of the switch unit and a second input corresponding to the deformation of the pressure sheet unit.

In the electronic device according to various embodiments, the pressure sensing unit may include a first region configured to sense a pressure change according to a first deformation of the pressure sheet unit and a second region disposed around the first region and configured to sense a pressure change according to a second deformation of the pressure sheet unit.

In the electronic device according to various embodiments, the pressure sensing unit may include a first pattern unit configured to sense the pressing of the dome switch unit and a second pattern unit disposed around and adjacent to the first pattern unit and configured to sense the pressing of the pressure sensing unit.

According to various embodiments, the electronic device may include: a board; a switch unit mounted on at least one face of the board; a pressure module provided between the pressure unit and the switch unit; and a pattern unit configured to generate a signal by sensing at least one drive according to the pressing of the switch unit.

In the electronic device according to various embodiments, the pressure module may include a pressure sheet unit mounted on the pattern unit and configured to move based on the user input, and a spacer unit stacked between the pattern unit and the pressure sheet unit.

In the electronic device according to various embodiments, the intensity of the pressure may be measured through a change in resistance according to the contact between the pressure sheet unit and the pattern unit or the movement of the pressure sheet unit.

In the electronic device according to various embodiments, the switch unit may include: a metal dome mounted on the pressure seat section and disposed at a position of the pattern unit, so that the metal dome is deformed in at least a part of the shape thereof based on the user's input; a dome sheet on which the metal dome is seated; and a sheet top stacked on the dome sheet unit.

In the electronic device according to various embodiments, the electronic device may further include a touch panel above the switch unit.

In addition, according to various embodiments, there is provided a method for acquiring a user input in an electronic device including a board configured to acquire a user input, at least one pressure sheet unit spaced apart from at least a partial region of the board and configured to move in response to the user input, and a processor disposed in at least a partial region of the base unit. The method may include: measuring a pressure corresponding to the user input using the processor at least based on the movement of the pressure sheet unit; performing a function related to the pressure using the processor when the pressure satisfies a specified condition; and refraining from performing the function when the pressure does not satisfy the specified condition using the processor.

In addition, in the method for acquiring a user input according to various embodiments, the performing of the function may include changing a volume corresponding to the pressure.

In addition, in the method for acquiring a user input according to various embodiments, the performing of the function may include changing a size, position, or color of at least one graphic object corresponding to the pressure.

While the present disclosure has been shown and described with reference to certain embodiments thereof, it will be understood by those skilled in the art that various changes in form and details may be made therein without departing from the spirit and scope of the present disclosure as defined by the appended claims.

The invention claimed is:

1. An electronic device comprising:
a board;
a switch unit mounted on at least one face of the board;
a pressure device provided between the board and the switch unit; and
a pressure sensor disposed in a partial region of the board and configured to generate a signal by sensing at least one drive according to a pressing of the switch unit,
wherein the pressure device comprises a pressure sheet mounted on the pressure sensor and configured to move based on a user input, and a spacer unit stacked between the pressure sensor and the pressure sheet,
wherein the pressure sensor includes a first pattern and a second pattern surrounding the first pattern,
wherein the first pattern is configured to sense the pressing after the switch unit is pressed by a pressure configured to generate a first deformation of the pressure sheet,
wherein the second pattern is configured to sense the pressing after the switch unit is pressed by a pressure configured to generate a second deformation of the pressure sheet, and
wherein the second deformation is generated in advance of the first deformation.

2. The electronic device of claim 1, wherein the board is set to acquire a touch input or a fingerprint input as at least a part of a user input.

3. The electronic device of claim 1, wherein the pressure sensor comprises a conductor or at least one sensor forming a pattern.

4. The electronic device of claim 1, wherein the pressure sensor is to sense a touch input in a same direction, which is the same as a direction corresponding to a user input, and to acquire a pressure in a direction, which is opposite the direction corresponding to the user input.

5. The electronic device of claim 1, wherein the pressure sheet is set to move in a direction, which is opposite a direction corresponding to the user input.

6. The electronic device of claim 1, wherein the pressure sheet is set to move in a direction, which is the same as a direction corresponding to the user input.

7. The electronic device of claim 1, wherein an intensity of a pressure is measured through a change in resistance, capacitance, or temperature according to the contact between the pressure sheet and the pressure sensor or the movement of the pressure sheet.

8. The electronic device of claim 1, wherein the switch unit comprises a metal dome mounted on the pressure sheet and disposed at a position of the pressure sensor such that at least a part of a shape thereof is deformed based on the user input, a dome sheet configured to seat the metal dome thereon, and a sheet top stacked on the dome sheet.

9. The electronic device of claim 1, wherein the pressure sensor outputs a pressure value corresponding to at least one of a first input corresponding to a deformation of the switch unit and a second input corresponding to the deformation of the pressure sheet.

10. The electronic device of claim 1, wherein the pressure sensor is divided into a first region configured to measure a pressure according to a first deformation generated in the pressure sheet according to a deformation of the switch unit and a second region provided around the first region and configured to measure a pressure generated according to a second deformation of the pressure sheet.

11. The electronic device of claim 1, further comprising a touch panel provided above the switch unit.

12. The electronic device of claim 1, further comprising a processor to perform control to execute a preset function depending on whether or not a detected value satisfies a specified condition.

13. The electronic device of claim 1, wherein a preset function comprises at least one of changing a volume corresponding to a pressure, changing a size, position or color of at least one graphic object, or changing a user interface, a user environment or a menu.

* * * * *